Fig. 4

Table I

| Run No. | Feed Rates (#/Hr.) HCN | Cl$_2$ | H$_2$O | Overhead Gas Composition % CNCl | % Cl$_2$ | % HCl | ppm HCN | ppm N$_2$ | % CNCl | Column Highest Temp. °C | Average Conversion HCN → CNCl | Hydrolysis |
|---|---|---|---|---|---|---|---|---|---|---|---|---|
| 1 | 6.6 | 26.8 | 36.5 | 87.5-99.9 | Tr-12.5 | 14.8-16.1 | Tr-1270 | 45-256 | 1.1-2.2 | 50 | 99.78 | 0.082-0.35 |
| 2 | 6.5 | unknown | 36.5 | 86-90 | Tr-14 | 15 - 16.5 | Tr-2500 | 96-459 | 0.88-1.62 | 55 | 99.29 | 0.17-0.75 |
| 3 | 5.8 | " | 36.5 | 82-94 | 6-18 | 14.4-15.2 | Tr- | 20-155 | 1.2-1.5 | 49 | 99.85 | 0.038-0.27 |
| 4 | 6.75 | 23.2 | 45.5 | 87.4-99.3 | 0.7-12.6 | 12.1-15.5 | Tr-700 | 83-1100 | 1.7-2.25 | 39 | 98.95 | 0.185-1.92 |
| 5 | 7.2 | 26.4 | 46.5 | 91.2-94 | 6-8.8 | 14 - 14.5 | Tr-350 | 15-48 | 1.02-1.3 | 45 | 99.94 | 0.029-0.09 |
| 6 | 7.2 | 27.2 | 45.5 | 89-98.9 | 1-11 | 16.1-16.7 | Tr- | 49-130 | 0.89-1.45 | 50 | 99.71 | 0.082-0.21 |
| 7 | 6.9 | 26.5 | 45.5 | 93.5-96 | 4-6.5 | 14.3-16.5 | Tr-117-282 | 20-260 | 0.93-1.9 | 70 | 99.88 | 0.038-0.21 |
| 8 | 5.0 | 14.0 | 24.0 | 87-94.6 | 5.4-13.0 | 18.5-20.6 | | 700-2300 | | 55 | 97.6 | 1.02-3.12 |
| 9 | 5.0 | 13.5 | 24.0 | 92.0-95.3 | 1.3-8.6 | 15.1-23.4 | | 240-4400 | | 53 | 96.0 | 0.43-5.1 |
| 10 | 5.0 | 13.5 | 26-28 | 90.3-95.0 | 5.0-9.7 | 20.6-23.7 | | 1800-2700 | | 62 | 97.0 | 2.4-3.1 |
| 11 | 7.0 | 20 | 25-34 | 87.0-91.8 | 8.7-13.0 | 18.2-25.9 | | 800-1500 | | 52 | 98.5 | 0.97-2.03 |
| 12 | 4.1 | | | 82.3-95.5 | 4.5-17.7 | 12.7-19.3 | Tr- | 30-1300 | | 50 | 96.5 | 0.056-1.8 |
| 13 | 7.04 | 20-24.8 | 49 | 95.5-97.7 | Tr-4.0 | 15.2-17.0 | Tr- | 60-600 | | 68 | 97.5 | 0.1-1.0 |
| 14 | 7.05 | 24.0-248 | 50 | 86.4-92.8 | 7.2-13.6 | 15.9-17.9 | Tr- | 400-1100 | | 54 | 99.5 | 0.61-1.87 |
| 15 | 7.93 | 24.0 | 49 | 91.8-97.0 | 3.0-8.2 | 18.2-20.9 | Tr- | 400-700 | | 72 | 99.5 | 0.57-0.91 |
| 16 | 6.8 | 22.8 | 49 | 83.0-92.0 | 8.0-17.0 | 15.2-15.7 | Tr- | 4-65 | | 51 | 97.8 | 0.007-0.12 |

United States Patent Office 3,681,034
Patented Aug. 1, 1972

3,681,034
APPARATUS FOR PRODUCING CYANOGEN CHLORIDE USING A FLOODED REACTION
William John Evers, 39 Fenwick Road,
Mobile, Ala. 36608
Original application Feb. 17, 1967, Ser. No. 616,875.
Divided and this application Apr. 29, 1970, Ser.
No. 43,644
Int. Cl. B01j *1/00, 7/02;* C01c *3/00*
U.S. Cl. 23—283                                                    2 Claims

ABSTRACT OF THE DISCLOSURE

An apparatus for reacting hydrogen cyanide and chloride to produce cyanogen chloride. A reaction and scrubbing column has a packing-free reaction section in the lower part thereof having at least one inner tube and an outer tube therearound defining a cooling fluid circulating chamber between the inner and outer tubes, the outer tube having a fluid inlet and a fluid outlet therein. The reaction section has a feed inlet for hydrogen cyanide intermediate the ends thereof, a packed scrubbing section next above the reaction section and a water inlet means and a cyanogen chloride outlet means at the top thereof. A chlorine-cyanogen chloride line opens into the bottom of the reaction section and is adapted to extend to the top of a stripping column. An outlet line extending out of the bottom of the reaction section and is adapted to place it in communication with the top of the stripping column. Pump means is provided in the outlet line and valve means are provided in the outlet line downsteam of the pump means. Pressure sensing control means is connected between the valve means and the bottom of the reaction column for sensing the head of liquid reaction medium in the reaction column and controlling the valve means for maintaining the head to keep the reaction section full of reaction medium.

---

This application is a division of my copending application Ser. No. 616,875, filed Feb. 17, 1967.

BACKGROUND OF THE INVENTION
Field of the invention

This invention relates to a method and apparatus for the production of cyanogen chloride, and more particularly it relates to the production of caynogen chloride in a flooded cooled reactor column at higher acid conditions than heretofore thought possible.

Cyanogen chloride is a valuable intermedaite for the production of cyanuric chloride, which in turn is useful as an intermediate for the manufacture of many products, such as chemotherapeutic agents, herbicides, dyes, brightening agents, synthetic resins, plastics, rubber, explosives and other materials.

Description of the prior art

A presently used commerical process of preparing cyanogen chloride for conversion into cyanuric chloride is described in U.S. Pat. 3,197,273 in the nameof Elwood Bruce Trickey. In this process, chlorine and hydrogen cyanide are charged into the reaction section of a packed column having a purification, washing or scrubbing section, a reaction section, and a stripping section. Water is fed in at the top of the scrubbing section and steam is introduced at the base of the column at the bottom of the stripping section. By maintaining the proper rates of feed of the various materials, the temperature and conditions in the column can be maintained such that a high yield of cyanogen chloride is obtained as a gas at the top of the reactor.

The process of this patent, while it is quite satisfactory with respect to the quality and amount of the product which it is desired to produce, also produces at the bottom of the reactor column a by-product of dilute, i.e. 2–3% aqueous hydrochloric acid. This by-product is relatively easily disposed of when the quantity thereof is small, but in actual practice, the amounts produced are so great that they cannot be disposed of simply by discharging into a stream or river without exceeding the amount which can be so discharged as established by pollution control standards. The alternative of concentrating the dilute hydrochloric acid and using it in other processes or selling it is not economically feasible, since the costs of concentrating the dilute acid are greater than purchasing concentrated acid from commercial sources.

Production of the cyanogen chloride under conditions which would produce the by-products aqueous hydrochloric acid at higher concentrations have heretofore appeared to be an unlikely solution to the problems of by-product disposal or by-product recovery, because of the twin problems of intolerable, from the commercial standpoint, losses of the cyanogen chloride reaction product by hydrolysis and directly from the bottom of the reaction column along with the by-product hydrochloric acid. The necessity to keep hydrolysis losses low and substantially eliminate direct loss of cyanogen chloride are essential to the successful commercial production of cyanogen chloride. A third essential condition is the prevention of the formation of $NCl_3$, which is extremely explosive and therefore an undesired reaction product not only from the standpoint of loss of the primary product but also from the standpoint of safety.

SUMMARY OF THE INVENTION

The present invention relates to a method and apparatus for overcoming the problems described above and carrying out the reaction of chlorine and hydrogen cyanide to produce cyanogen chloride by feeding the two raw materials into a flooded reaction section of a reaction and scrubbing column and extracting heat from the flooded section of the column by circulating cooling fluid around the flooded section of the column. By carefully controlling the conditions in the reaction column, a very high rate of conversion to cyanogen chloride can be achieved at low hydrolysis losses and production of aqueous hydrochloric acid in concentrations up to about 26%.

BRIEF DESCRIPTION OF THE DRAWINGS

The invention will be described in connection with the accompanying drawings, in which:

FIG. 4 is a table of the conditions and results obtained in carrying out the method of the invention in an apparatus like that of FIGS. 1 and 2.

DESCRIPTION OF THE PREFERRED EMBODIMENTS

Figure 1:
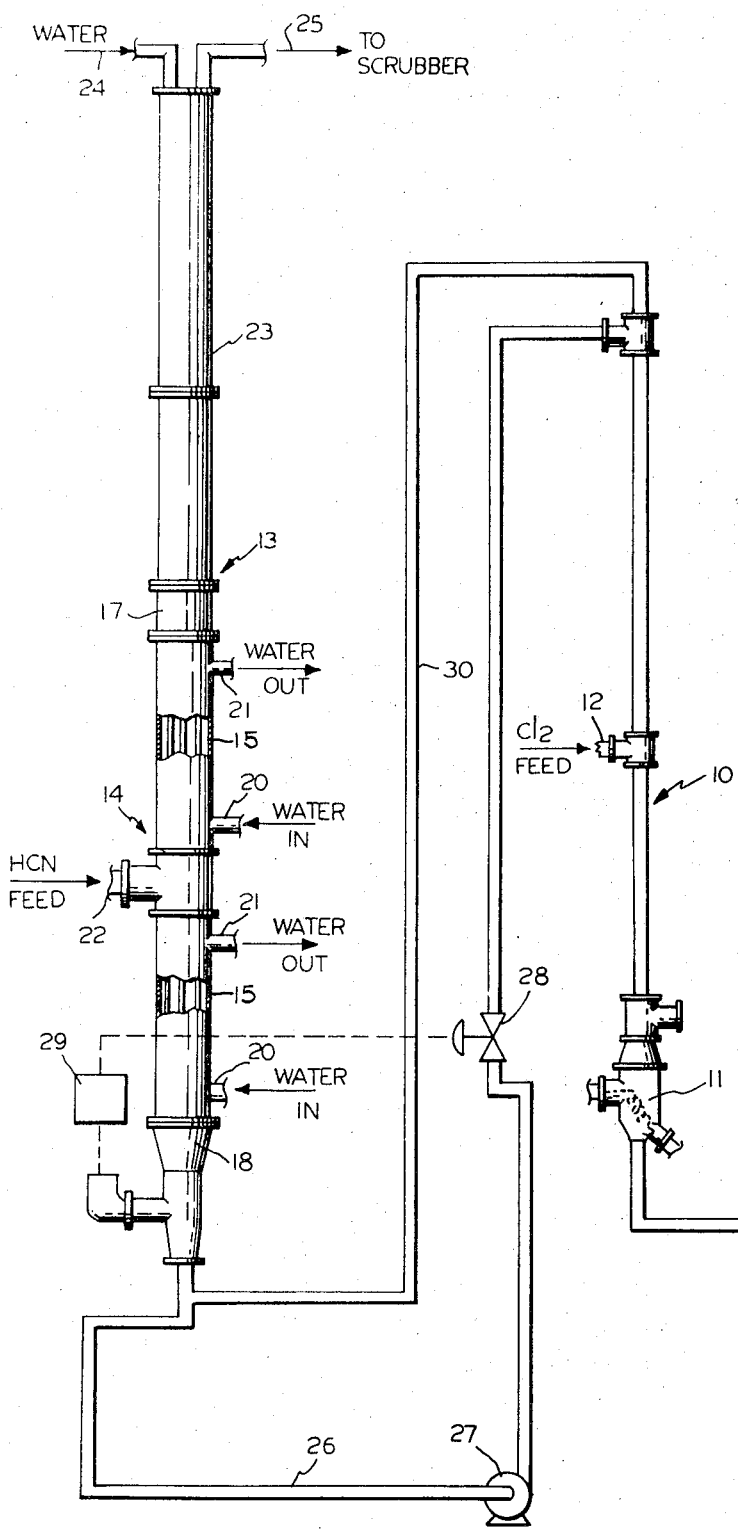
FIG. 1 is a schematic view of an apparatus including flooded reactor type reaction column and arranged to carry out the method of the present invention.

The apparatus of the present invention comprises a reaction and scrubbing column 13 which has a lower reaction section 14 comprised of two multi-tube reactors 15, each of which has a plurality of inner tubes 16 extending between a feed inlet chamber 17 and an outlet chamber 18 and which has an outer tube 19 surrounding the inner tubes 16 to form a cooling fluid chamber 19a through which cooling fluid can be passed from cooling fluid inlet 20 to cooling fluid outlet 21. Outlet chamber 18 includes the short vertical section of pipe attached to the bottom thereof.

Opening into the feed inlet chamber 17 of the lower reactor 15, which is also the outlet chamber for the upper reactor 15, is an HCN inlet 22. Next above the upper reactor 15 is a scrubbing section 23, which is a packed tower and which has a water inlet 24 and a gas outlet 25 at the top thereof through which water is fed into the scrubbing section 23 and gas produced within the reactors and which flows up through the scrubbing section is taken out of the reaction and scrubbing column 13.

Connected to the bottom of the outlet chamber 18 of the lower reactor 15 is an HCl line 26 which preferably extends to a stripping column for recovering CNCl and chlorine from the reaction medium. The stripping column is here shown as a stripping column 10 the specific design of which forms no part of the present invention. The line 26 opens into the top of the stripping column 10 just below the top thereof. Means are also provided to maintain a head in the reaction section 14. The HCl line 26 has a pump 27 therein and a valve 28 which can be controlled by a pressure condition responsive means 29 mounted on the outlet chamber 18 and responsive to pressure conditions therein for controlling the valve 28. Connected between the top of the stripping column 10 and a point in the outlet chamber 18 at the bottom of the lower reactor 15 is a line 30 for feeding chlorine containing CNCl stripped from the HCl in the stripping column 10.

In operating the apparatus to carry out the method, the lower reaction section 14 of the reaction and scrubbing column 13 is kept flooded with liquid reaction medium, which is aqueous hydrochloric acid with HCN, chlorine and CNCl dissolved therein and also in gaseous form therein. Gaseous chlorine is fed into the chlorine inlet 12 in the middle of the stripping column 10, and hydrogen cyanide, preferably in liquid form, is fed into the middle of the lower reaction section through the HCN inlet 22. The amount of chlorine is in excess of that which is theoretically necessary to convert all of the HCN into CNCl. Water is fed into the top of the reaction and scrubbing column through the water inlet 24. A cooling fluid, for example water, is circulated through the cooling fluid chambers 19a, being fed into the chambers through the inlets 20 and flowing out through the outlets 21. This cooling fluid removes the heat of reaction from the reactors 15 in which the main part of the reaction takes place.

Chlorine CNCl fed into the bottom of the lower reactor 15 through the outlet chamber 18 passes upwardly through the reaction medium therein, and the chlorine performs the dual function of reacting with the HCN fed into the middle of the lower reaction section 14 between the two reactors 15 and stripping the HCN from the reaction medium in the lower reactor 15. Since the overall movement of the liquid reaction medium is in the downward direction, much of the HCN will move into the lower reactor, and of course the natural tendency is for it to move upwardly into the upper reactor. Thus most of the HCN will react with the chlorine in the reaction section 14, although some of the reaction will take place above the upper reactor 15 in the lower end of the scrubbing section 23.

Gaseous CNCl will flow up through the scrubber section 23 where it is washed by the downflowing water to remove any HCN therein, and gaseous CNCl together with any excess chlorine will flow out through the gas outlet at the top of the reaction and scrubbing column 13. Aqueous hydrochloric acid containing very small amounts of HCN and chlorine and saturated with CNCl will be pumped out of the bottom of the outlet chamber 18 by the pump 27 and, if desired, pumped to the upper end of a stripping column, such as the stripping column 10. In order to increase the efficiency of the overall process, it will there be stripped of the CNCl and chlorine, and chlorine will flow upwardly and join the chlorine being fed into the stripping column through the chlorine inlet 12. The thus stripped aqueous hydrochloric acid is removed from the bottom of the stripping column 10.

Figure 2:
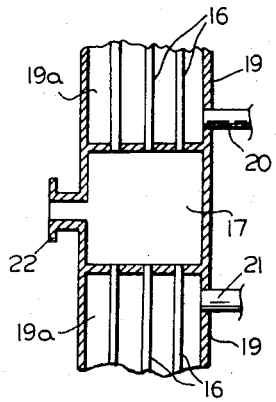
FIG. 2 is an enlarged cross-sectional view of the portion of the apparatus between the two flooded reactor sections.
Figure 3:
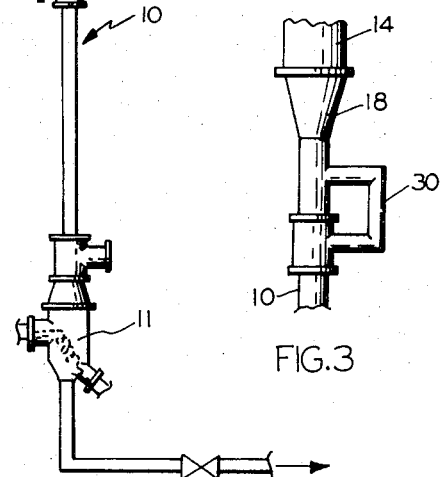
FIG. 3 is a view of a part of the modified form of apparatus including a flooded type reaction column.

It should be pointed out that it is necessary to run the apparatus of FIGS. 1 and 2 in such a way that the pressure of the chlorine being fed to the bottom of the reaction and scrubbing column 13, which in the embodiment shown is the chlorine pressure in the stripping column 10 and the line 30, is sufficiently greater than the head of reaction medium in the reaction section 14 so that the reaction medium will not flow into the line 30. It is also noted that the line 30 enters the bottom of the oulet chamber 18 a short distance above the point where the reaction medium is pumped out. This insures that the chlorine flows upwardly in the lower reactor 15. It is also preferable to provide packing in the outlet chamber 18 to insure breaking up of the gaseous chlorine flowing into the chamber 18.

The temperature conditions in the reaction and scrubbing column 13 are kept below the temperatures of the colum used in the process described in the above mentioned patent. Sufficient cooling liquid is passed through the cooling fluid chambers 19a to keep the temperatures at the bottom and middle of the reaction section 14 between about 25 and 40° C., and the temperature at the top of the reaction section 14 between about 45 and 60° C. Immediately above the top of the reaction section 14 in the lower end of the scrubbing section 23 the temperature will rise due to the fact that a small part of the reaction will be taking place here, but it is preferred to control the conditions so that the temperature in the lower part of the scrubbing section does not rise much above about 65 to 70° C. The amount of heat of reaction extracted in the reaction section 14 is sufficient so that with the radiation of heat from the scrubbing section 23 of the column and the cooling effect of the water fed into the top of the column, the temperatures within the scrubbing section fall rather rapidly higher up in the scrubbing section 23, until at the top of the column, the temperature has fallen to near 25° C. It is preferred to reach this temperature at the top of the column, since at temperatures above this, not all of the HCN may be stripped out of the cyanogen chloride. To aid in reaching these conditions, the temperature of the water fed into the top of the column should be between 13–25° C. and preferably 15–20° C. Lower temperatures may cause liquefication of the cyanogen chloride.

The amounts of the reaction products HCN and chlorine fed to the reaction section 14 and the amount of water fed to the top of the reaction and scrubbing column 13 are controlled to cause the reaction to be carried out so that the concentration of the aqueous hydrochloric acid at the bottom of the reaction and scrubbing column is up to about 26%. The actual amounts used will depend mainly on the size of the apparatus, and only small variations should be necessary to take into account the temperature of water being fed to the top of the scrubbing section 23. Temperature control of the reaction will be mostly by means of the cooling fluid being passed through the cooling fluid chambers 19a and the temperature and amounts of such cooling fluid.

In order to illustrate the invention more fully, a series of examples will be given for a flooded reactor type apparatus of a specific size and configuration.

EXAMPLE 1-7

The reaction sections 15 of the apparatus were each 4" in diameter and 6 ft. long, and each had four ⅞ in. tubes therein. The scrubbing section 23 was two 10 ft. packed tubes, 3" in diameter. The stripping column 10 actually used in runs is positioned adjacent the reaction column, and is preferably a column as disclosed in co-pending application Ser. No. 608,076 filed Jan. 9, 1967, now U.S. Pat. 3,535,000 in the name of William S. Durrel et al. It is packed with conventional shapes, such as rings, saddles or the like, and it has a steam reboiler 11 in the bottom thereof. The stripping column is in two sections and has a chlorine inlet 12 between the two sections.

The column was flooded with HCl at a concentration of from about 12 to about 17% and was operated continuously for a number of hours, the chlorine, HCN and water being metered into the column at the rates and with the results set forth in Table I for runs 1–7. It should be pointed out that the bottoms composition was that measured at the outlet from the bottom of the reaction column 13 and prior to feeding to the stripper 10. Only the $N_2$ content is given for the bottoms composition at the outlet of the stripper 10. After the reaction medium was passed through the stripper, only traces of HCN and CNCl were found therein. With respect to the overhead gas composition, no detectable amounts of either HCN or HCl were found in any of the runs.

It will be seen that the overhead gas composition was very good, containing only small amounts of chlorine, which amounts are necessary to prevent the cyanogen chloride from poisoning the catalyst in the subsequent trimerizing step to convert the cyanogen chloride to cyanuric chloride, and containing substantially no unreacted HCN nor any hydrochloric acid. The acid concentration in the bottoms composition was relatively low as compared to other examples to be set forth hereinafter, but was very much higher than in the prior art methods, ranging up to about 16.7%. The percent of conversion was extremely high and the hydrolysis losses were extremely low.

EXAMPLES 8-11

The apparatus was modified somewhat from that shown in the drawings. Only a single reaction section 15 was provided, being a 9 ft. tube having a single 1½" tube therein. The stripper was the same as the upper half of the stripper 10 of FIG. 1, no provision being made for recovery of the chlorine by applying heat with a steam boiler.

The operation of the column was substantially the same as in Examples 1–7, the conditions and results being as shown in runs 8–11 of Table I. The HCN was fed from the top of the reaction section of the column, except in run 11, in which it was fed from the bottom. The bottoms composition was that at the bottom of the stripper, for both the HCN and $N_2$. No measurements were taken of the CNCl in the bottoms composition, and the chlorine was not stripped. With respect to the overhead gas composition, no detectable amounts of either HCN or HCl were found in runs 8–10, and up to 1.5% was found in run 11.

While the overhead gas composition retained its good characteristics, and the concentration of the acid reaction medium was very high, the conversion rates were reduced somewhat with corresponding slight increases in hydrolysis losses.

EXAMPLES 12-16

The apparatus was modified somewhat from that shown in the drawings in that the stripping column was the same as the upper half of the stripper 10 of FIG. 1. Otherwise, the apparatus, particularly with respect to the reaction and scrubbing column 13, was the same as shown in the drawings.

The operation of the apparatus was also the same as in Examples 1–7, the conditions being as shown in runs 12–15 in Table I. The HCN was fed from the middle of the reaction sections 15 as in Examples 1–7. The bottoms composition was that measured after the stripping column. With respect to the overhead gas composition, no detectable amounts of either HCN or HCl were found, except in runs 13, in which 1.5 to 3.7% HCN was detected.

The various types of apparatus described above and used in the respective examples had either a single tube or four tubes in the reactor, but the invention is not limited to such types of reactors, but includes reactors having other numbers of tubes each of which is flooded during operation.

There has thus been provided a flooded reaction column having a cooled middle portion, and a method of operation of the column to produce cyanogen chloride by reacting HCN and chlorine in the HCl acid reaction medium while extracting a large part of the heat of reaction from the reaction zone of the column and thereby enabling the by-product aqueous hydrochloric acid to be produced at a much higher concentration than heretofore. The more highly acid conditions under which the cyanogen chloride is produced do not, by operating the apparatus under the conditions of the method, cause any great drop in the efficiency of the process nor do they give undesirable characteristics to the resulting primary product. The more highly concentrated hydrochloric acid can be more easily converted into hydrochloric acid of a concentration in which it is directly usable or it can be used under some circumstances in the concentrations in which it comes from the bottom of the reaction column.

It is thought that the invention and its advantages will be understood from the foregoing description and it is apparent that various changes may be made in the form, construction and arrangements of the parts without departing from the spirit and scope of the invention or sacrificing its material advantages, the form hereinbefore described and illustrated in the drawings being merely a preferred embodiment thereof.

What is claimed is:

1. An apparatus for reacting hydrogen cyanide and chlorine to produce cyanogen chloride, comprising a reaction and scrubbing column having a packing-free reaction section in the lower part thereof having at least one inner tube and an outer tube therearound defining a cooling fluid circulating chamber between said inner and outer tubes, said outer tube having a fluid inlet and a fluid outlet therein, and said reaction section having a feed inlet for hydrogen cyanide intermediate the ends thereof and an outlet chamber at the bottom thereof, a packed scrubbing section next above the reaction section and having a water inlet means at the top thereof and a cyanogen chloride outlet means at the top thereof, a stripping column having a chlorine feed means intermediate the ends thereof, a chlorine-cyanogen chloride line having one end opening into the outlet chamber and the other end connected to the top of said stripping column, and an outlet line extending out of the outlet chamber and connected to the top of the stripping column just under the connection of said chlorine-cyanogen chloride line, said chlorine-cyanogen chloride line being connected to said outlet chamber above the point at which said outlet line is connected to said outlet chamber, pump means in said outlet line, valve means in said outlet line downstream of said pump means, and pressure sensing control means connected between said valve means and the bottom of said reaction column for sensing the head of liquid reaction medium in said reaction column and controlling said valve means for maintaining said head to keep said reaction section full of reaction medium.

2. An apparatus as claimed in claim 1 in which said reaction section is in two substantially equal length parts and has a feed inlet chamber intermediate the two parts into which said hydrogen cyanide feed inlet opens.

References Cited

UNITED STATES PATENTS

| 2,672,398 | 3/1954 | Huemer et al. | 23—359 |
| 3,535,091 | 10/1970 | Trickey | 23—283 X |

FOREIGN PATENTS

| 222,875 | 6/1910 | Germany | 23—1 B |

JAMES H. TAYMAN, Jr., Primary Examiner

U.S. Cl. X.R.

23—263.1 B, 359; 261—147, 149, 152

PO-1050
(5/69)

UNITED STATES PATENT OFFICE
CERTIFICATE OF CORRECTION

Patent No. 3,681,034        Dated August 1, 1972

Inventor(s) WILLIAM JOHN EVERS

It is certified that error appears in the above-identified patent and that said Letters Patent are hereby corrected as shown below:

Put in heading:

-- Assignor to Ciba-Geigy Corporation, Greenburgh, New York --

Signed and sealed this 10th day of April 1973.

(SEAL)
Attest:

EDWARD M. FLETCHER, JR.        ROBERT GOTTSCHALK
Attesting Officer              Commissioner of Patents